March 31, 1931.   W. E. HOKE   1,798,604
SELF LOCKING COUPLED SCREW ELEMENT
Filed Nov. 1, 1927   2 Sheets-Sheet 1
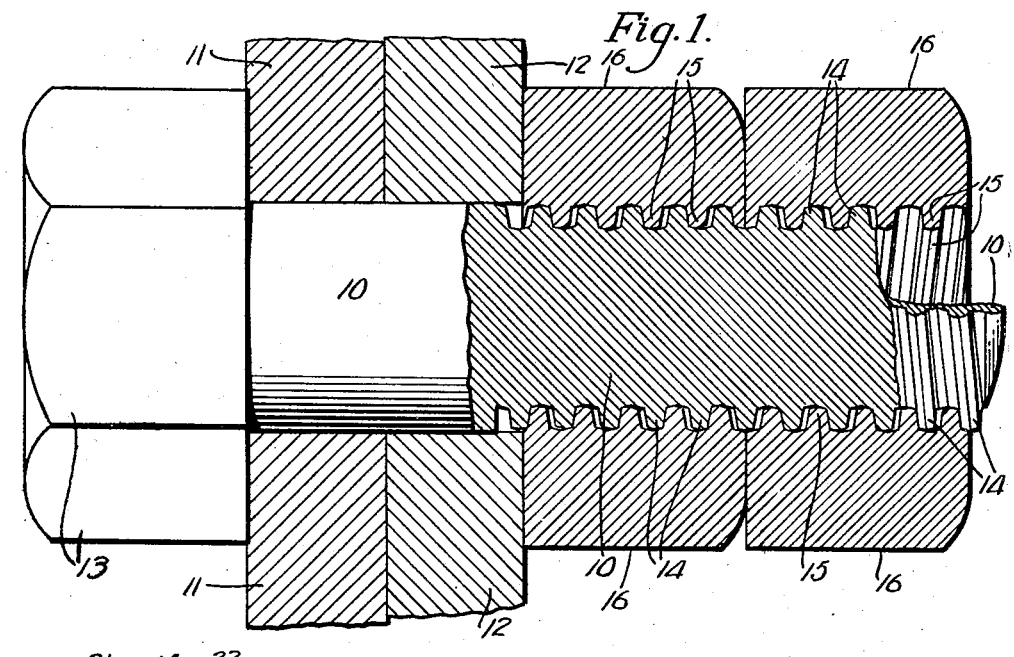
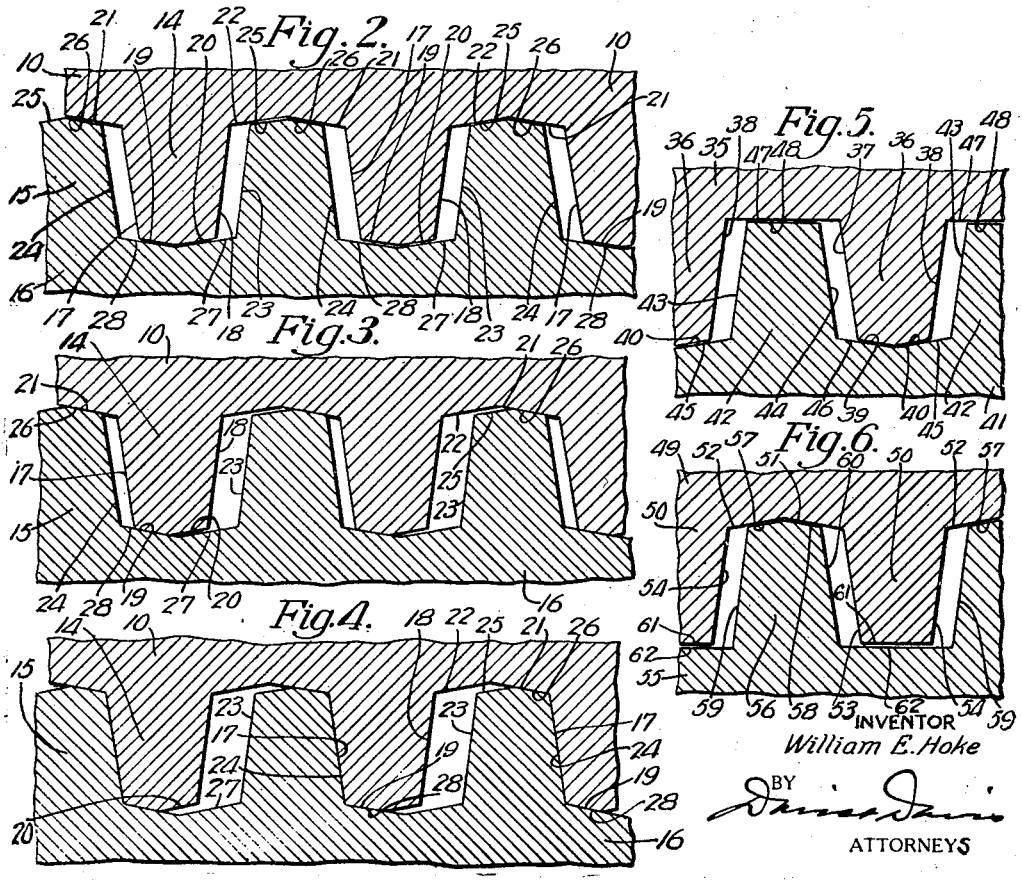
INVENTOR
William E. Hoke
BY
ATTORNEYS March 31, 1931.  W. E. HOKE  1,798,604
SELF LOCKING COUPLED SCREW ELEMENT
Filed Nov. 1, 1927  2 Sheets-Sheet 2
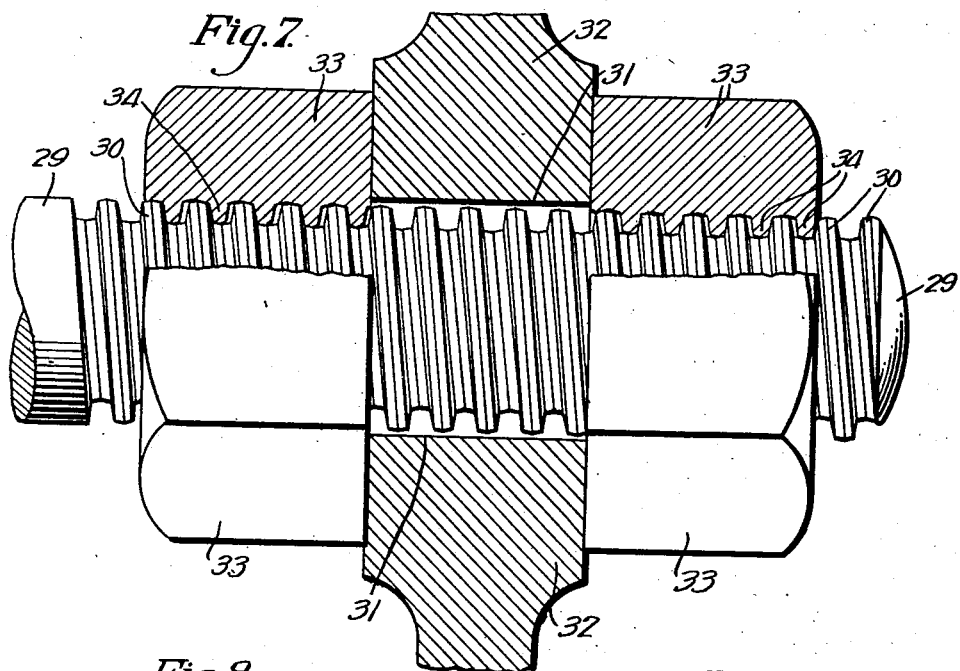
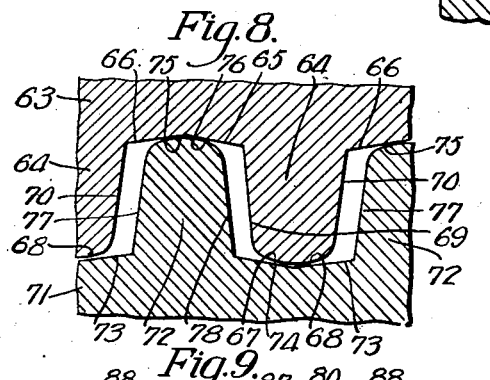
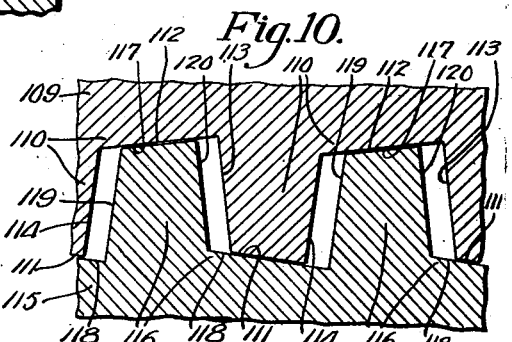
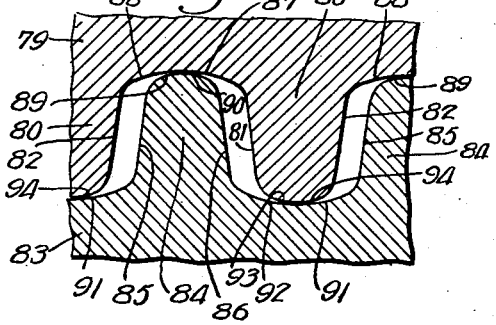
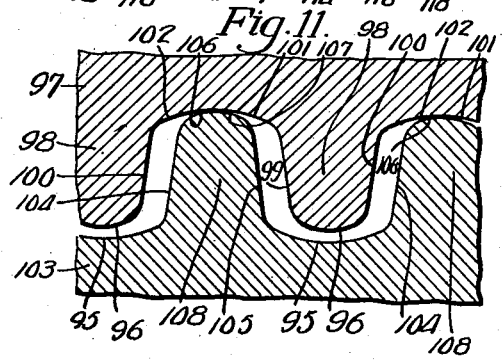
INVENTOR
*William E. Hoke*
BY
ATTORNEYS Patented Mar. 31, 1931

1,798,604

UNITED STATES PATENT OFFICE

WILLIAM E. HOKE, OF BALTIMORE, MARYLAND, ASSIGNOR, BY MESNE ASSIGNMENTS, TO DARDELET THREADLOCK CORPORATION, OF NEW YORK, N. Y., A CORPORATION OF DELAWARE

SELF-LOCKING COUPLED SCREW ELEMENT

Application filed November 1, 1927. Serial No. 230,300.

This invention relates to improvements in self-locking coupled screw elements, such as bolts and nuts, and has for its objects to provide a screw thread connection in which the male and female threads may be locked together by crosswise displacement of a thread of one class relatively to a thread of the other class in either direction; to provide coupling threads for male and female screw elements capable of locking one on the other under the influence of axial reaction forces tending to displace the threads in either direction axially of the engaged threads and also adapted to resist great axial stresses after locking and to permit continued relative screwing movement between the elements after locking; to provide a screw-threaded element with which two screw-threaded elements both having identical screw threads may be connected by screw engagement of their threads with the thread of the first-mentioned element and each adapted to be locked thereon by reaction forces tending to displace the threads of the second-mentioned elements crosswise of the thread of the first-mentioned element in opposite directions; to provide self-locking threads for bolts and nuts formed to permit the threading of a plurality of identical nuts on the bolt thread and locking of all of the nuts on the bolt thread by reaction forces generated in screwing the nuts in either the same or opposite directions against the work; to provide self-locking threads for bolts and nuts formed to permit jamming of identical threads of a plurality of nuts screwed on a bolt into self-locking engagement with a thread on the bolt by axial reaction forces displacing the threads of the nuts in different directions crosswise of the bolt thread; to provide a screw threaded element, such as a bolt or nut, having a jam-locking screw thread formed with oppositely facing thread-lock surface portions having a low slope relatively to the axial line of the thread and oppositely facing surface portions disposed abruptly to the axial line of the thread for limiting the jamming action between the thread-locking portions and an engaged thread; to provide a screw threaded element, such as a bolt or nut, having one or more pairs of oppositely facing thread-locking portions making an angle with the axial line of the thread less than the angle of friction and a pair of oppositely facing abutment surface portions making an angle with the axial line of the thread greater than the angle of friction for limiting the jamming action between the thread-locking portions and an engaged thread; and the provide a double-acting, thread-locking, tight-screwing, thread connection of the jam action type for male and female screw elements, such as bolts and nuts, in which screwing movement between the engaged elements may be continued after locking of the threads one on the other without increasing the stresses on the jammed thread surface portions, and in which the male and female screw elements may be repeatedly connected and disconnected without permanent distortion of the threads or impairment of the locking effect when the elements are connected.

Other objects and advantages of the invention will appear from the following description in detail of the embodiments thereof illustrated in the accompanying drawings, in which:

Figure 1 is a view, partly in longitudinal section, showing a bolt and nut assembly wherein work is clamped between a nut and the head of the bolt, two nuts having identical screw threads being screwed on the threaded end of the bolt and abutting each other, the inner nut engaging the work;

Fig. 2 is a detail longitudinal sectional view showing male and female threads of the form illustrated on the bolt and nuts in Fig. 1 in neutral position;

Fig. 3 a view similar to Fig. 2 showing said threads displaced crosswise of each other in one direction sufficiently to take up the clearance between one pair of similarly inclined thread-locking surfaces on the nut thread and the similarly inclined pair of thread-locking surfaces on the bolt thread, in which position the engaged surfaces are adapted to coact to cause the nut to advance toward the head of the bolt, assumed to be at the left, as in Fig. 1;

Fig. 4 a view similar to Fig. 2 showing the said threads displaced crosswise in the same direction as in Fig. 3 the full limit allowed by one set of coacting abutment surface portions on the threads, in which position the engaged thread-locking surfaces are jammed into self-locking relation with each other to prevent accidental turning of the nut while the engaged abutment surface portions are coactive to cause additional advance of the nut toward the bolt head upon continued screwing up of the nut;

Figs. 5 and 6 are views similar to Fig. 2 showing two slightly modified forms of thread connection in which each thread has only one pair of oppositely inclined thread-locking surface portions;

Fig. 7 a view, partly in longitudinal section, showing one end of a nut and bolt assembly wherein two nuts are screwed on the same bolt thread against opposite faces of a work piece penetrated by the bolt, as in the case of one end of a stay-bolt and nut assembly, the threads being of the same form as shown in Figs. 1 to 4; and Figs. 8, 9, 10 and 11 are views similar to Fig. 2 showing four different forms of thread connections either of which, as well as either of the forms shown in Figs. 5 and 6, may be substituted for the form of thread connection illustrated in Figs. 1 to 4 and Fig. 7, on male and female screw elements designed for connection with each other.

While I have illustrated two situations in which a double-acting thread lock is of advantage and have shown several forms of coactive double-acting self-locking male and female screw threads, it will be understood that my invention is not limited to the forms of threads shown or to the uses for such threads which I have illustrated.

Referring to Figs. 1 to 4, inclusive, 10 designates the shank of the bolt which passes through a pair of work pieces 11 and 12 to be clamped together, 13 designates the head of the bolt which abuts at its inner end against the outer face of the work piece 11, 14 designates the male screw thread formed on that end portion of the bolt shank remote from the bolt head, and 15 designates the threads of each of two nuts 16 screwed on the threaded end of the bolt shank with the inner end of the inner nut abutting against the outer face of the work piece 12 and the inner end of the outer nut abutting against the outer end of the inner nut. The threads 15 of the two nuts are of identical cross-sectional form and pitch and are of the same pitch as the bolt thread 14.

The bolt thread 14, as more clearly shown in Figs. 2, 3 and 4, is formed with two oppositely facing, helicoidal, abutment surface portions 17 and 18 in axial register and each making an abrupt angle with the axial line of the thread and preferably flaring outwardly from each other toward the base of the thread groove, as shown, and meeting at their edges located farthest from the axial line of the thread the outer edges of two oppositely facing, helicoidal, thread-locking surface portions 19 and 20 of the thread which are in axial register. The inner edges of surface portions 19 and 20 meet at the highest point of the thread rib and slope slightly toward the axial line of the thread in opposite directions from their meeting edges to the adjacent edges of abutment surface portions 17 and 18, respectively. Thread 14 is also formed with two additional oppositely facing, helicoidal, thread-locking surface portions 21 and 22 in axial register lying parallel with surface portions 19 and 20, respectively, and sloping slightly in opposite directions from their inner edges toward the axial line of the thread from the edges of abutment surface portions 17 and 18, respectively, located nearest the axial line of the thread to the lowest part of the thread groove where the outer edges of said locking portions 21 and 22 of adjacent convolutions of the thread meet each other. The angle made by the abutment surface portions with the axial line of the bolt shank and its thread should be sufficiently great to exceed the angle of friction of the bolt and nut material, and the angle made by the thread-locking surface portions with the axial line of the bolt shank and its thread should be sufficiently small to be within and preferably substantially less than said angle of friction, and the bolt and nuts should preferably be formed of metal, although other suitable materials may be used if desired.

The thread 15 of each nut 16, as more clearly shown in Figs. 2, 3 and 4, is formed with two oppositely facing, helicoidal, abutment surface portions 23 and 24 in axial register and each making an abrupt angle with the axial line of the thread and preferably flaring outwardly from each other toward the base of the thread groove, as shown, and meeting at their edges located nearest the axial line of the thread the outer edges of two oppositely facing, helicoidal, thread-locking surface portions 25 and 26 of the thread which are in axial register. The inner edges of surface portions 25 and 26 meet at the highest point of the thread rib and slope slightly toward the axial line of the thread in opposite directions from their outer edges to their meeting edges. Thread 15 is also formed with two additional oppositely facing, helicoidal, thread-locking surface portions 27 and 28 in axial register lying parallel with surface portions 25 and 26, respectively, and sloping slightly in opposite directions from the edges of the abutment surface portions 23 and 24, respectively, located farthest from the axial line of the thread, to the lowest part of the thread groove where the outer edges of said locking portions 27 and 28 of adjacent convolutions of the thread meet each other.

Abutment surface portions 23 and 24 of the nut thread are opposed to abutment portions 18 and 17, respectively, of the bolt thread and make the same angle with the axial line of the threads; locking portions 25 and 27 of the nut thread are opposed to locking portions 22 and 20 respectively of the bolt thread and make the same angle with the axial line of the threads; and locking portions 26 and 28 of the nut thread are opposed to locking portions 21 and 19, respectively, of the bolt thread and make the same angle with the axial line of the threads, thus providing coacting pairs of parallel locking surface portions and coacting pairs of parallel abutment surface portions, each surface portion being of zero curvature transversely of the thread.

The contour of the bolt and nut threads are corelated to permit the threads, while engaged, to assume a neutral position (shown in Fig. 2) in which there is a slight clearance between the thread-locking surface portions on the nut thread 15 and the thread-locking surface portions on the bolt thread 14 which are coactive therewith in order to facilitate initial connection of the nut with the bolt. In this neutral position there is a relatively great clearance between the abutment surface portions of the nut thread and the abutment surface portions of the bolt thread which are coactive therewith, so that the engaged threads may be displaced crosswise of each other a substantial distance in both directions axially of the threads before bringing one or the other set of coactive male and female abutment surface portions into engagement; in other words, the abutment surface portions of the engaged threads are corelated to permit substantial side play between the threads 14 and 15, and by reason of the great angle they make with the axial line of the threads, said abutment surface portions are adapted to limit positively the extent of possible side play.

Upon screwing a nut 16 on the bolt, the coactive thread-locking surface portions 21 and 26 and the coactive thread-locking surface portions 19 and 28 of the threads 14 and 15 will be first brought into light contact (the threads assuming the partially displaced, initial screwing position shown in Fig. 3), and will coact to initially advance the nut at the pitch rate toward the head of the bolt and the work. If a single nut is to be used to clamp the work pieces 11 and 12, the nut will be screwed tightly up against the outer face of work piece 12 until the work pieces are firmly clamped between the nut and the head of the bolt. The reaction forces generated by the clamping action will, after the nut engages the work, slow down the rate of advance of the nut per turn to less than the pitch rate so that, as the nut is tightened up, the nut and bolt threads will be additionally displaced in the same direction beyond initial screwing position until the abutment surface portions 17 and 24 of threads 14 and 15 come into engagement (as shown in Fig. 4), whereupon crosswise displacement will be positively arrested with the thread-locking surface portions 21 and 26 and the thread-locking surface portions 19 and 28, respectively, jammed into self-locking frictional engagement with each other. When the threads are in the relative crosswise displaced position shown in Fig. 4, accidental loosening of the nut is impossible since, in riding up of the thread-locking surface portions 26 and 28 of the nut thread on the thread-locking surface portions 21 and 19 of the bolt thread, the nut is very slightly distended or expanded radially, so that the coacting thread-locking surface portions are gripped together under the elastic tension of the expanded nut. As these mutually gripping surface portions of the bolt and nut threads lie within the angle of friction of the surfaces in contact, it will be obvious that they are self-locked or self-held against accidental relative turning and also against accidental sliding toward neutral position even if axial play should develop between the work and the bolt head and nut. It will be obvious also that after the threads assume self-holding position, as shown in Fig. 4, the nut may be still further tightened, if it be necessary or desirable to do so in order to clamp the work with the desired degree of firmness, the abutment surface portions 17 and 24 of the bolt and nut threads coacting in this case to advance the nut against the work at the pitch rate without imposing additional stresses on the engaged thread-locking surface portions, so that the nut may be screwed up as firmly as desired, or as the work will permit, without danger of bursting the nut. The thread-locking and abutment surface portions of the threads are corelated to permit full jamming of the coactive locking surface portions, and arrest of the jamming action, by the coactive abutment surface portions within a proper safety limit determined by the elastic limit of the nut. It will be evident also that, if a nut is screwed in the opposite direction on the bolt from that shown in Figs. 2 to 4 against a work piece, the thread-locking portions 22 and 25 and 20 and 27, and abutment portions 18 and 23 will coact to effect screwing up and locking of the nut on the bolt.

With a bolt and nut, or any other form of coupled male and female screw elements, provided with threads of the form described, it will be evident that a self-locking action may be obtained whether the threads be displaced crosswise in one direction or the other, thereby affording a jam-locking thread of universal application. It will also be evident that a nut having such a thread will lock on a bolt or other male threaded element no matter which end of the nut be screwed against the work, and whether the nut be screwed toward or from the bolt head against the work. There are many advantages in this double-acting locking capacity of the thread, two important ones of which are illustrated in Figs. 1 and 7. Other instances of utility, in which but a single nut and bolt, or other pair of male and female screw members, are coupled, include insurance of locking of the nut on a bolt in clamping of work on the bolt by a single nut no matter which end of the nut is nearest the bolt head when the nut is screwed on, and the capacity of the nut to lock on a vertical bolt or threaded rod when the nut is used as an adjustable supporting abutment for another member.

In Fig. 1 is shown an application of the invention in which two superposed or abutting nuts are used to clamp work pieces 11 and 12 on the bolt between the bolt head and the innermost nut. By this arrangement a self-locking engagement of two nut threads with different sides of the bolt thread is obtained. This double locking effect gives an added factor of safety and also (by reason of the fact that the reaction between the abutting ends of the two nuts when the outer nut is tightened up displaces the two nut threads in opposite directions crosswise of the bolt thread to cause the locking surface portions at different sides of the two nut threads to bind on the locking surfaces at opposite sides of the bolt thread, with abutment surface portions at different sides of the two nut threads abutting abutment surface portions at opposite sides of the bolt thread, as shown in Fig. 1) prevents any possibility of either nut shifting toward neutral position under any possible shocks or vibrations to which the bolt, nuts, or work pieces may be subjected even when considerable play develops between the work and the bolt head and the work-engaging nut from wear or other causes.

In Fig. 7 is shown one end of a staybolt coupling, each end of bolt 29 having a screw thread 30 of the same form as the bolt shown in Fig. 1, said threaded end portions of the bolt each passing through an aperture 31 in a member 32, such as a tank wall, and having two nuts 33 (each having a thread 34 of the same form as thread 15 of nuts 16) screwed thereon up against opposite faces of the bolt-penetrated member 32 until the locking and abutment surface portions at opposite sides of the bolt thread are engaged by the coactive locking and abutment surfaces of the two nut threads which face away from the penetrated member stayed by the bolt and the pair of nuts.

While the male member in Fig. 7 has been shown and described as a staybolt and member 32 has been shown and described as a section of a tank or other wall to be stayed, it will be obvious that the arrangement of the parts 29, 32 and the nuts 33 shown in said view may be employed usefully in many other situations, such as for holding an adjustable collar on a rod or shaft, holding a valve or piston head to a stem or rod, and locking a diaphragm to a reciprocating rod, etc.

Instead of the male and female threads of the bolt and nut, or other male and female screw elements, having the form shown in Figs. 1 to 4 and Fig. 7, many other forms of coacting male and female threads may be provided for the screw coupled elements or members, which are within the scope of the invention, certain of these being shown in Figs. 5, 6, 8, 9, 10 and 11 of the drawings.

In Fig. 5, wherein the engaged nut and bolt threads are shown in neutral position as in Fig. 2, there is illustrated a threaded connection similar to that shown in Figs. 1 to 4, except that the thread-locking surface portions 21 and 22 of the bolt thread and the thread-locking surface portions 25 and 26 of the nut thread are omitted. In this construction the bolt 35 has a thread 36 formed with a pair of oppositely facing, abutment surface portions 37 and 38 similar to abutment surface portions 17 and 18 of the thread 14 of bolt 10, and a single pair of oppositely facing, thread-locking surface portions 39 and 40 similar to surface portions 19 and 20 of said thread 14; while the nut 41 has a thread 42 formed with a pair of oppositely facing, helicoidal abutment surface portions 43 and 44 similar to surface portions 23 and 24 of the thread 15 of nut 16, and a single pair of oppositely facing, helicoidal, thread-locking surface portions 45 and 46 similar to surface portions 27 and 28 of said thread 15. The bottom of the thread groove in the bolt 35 and the top of the thread rib on the nut 41 are concentric with the axial line of the thread and there is a slight clearance between these concentric, cylindrical, bolt and nut surfaces 47 and 48 to facilitate engagement of the nut with the bolt, as shown.

In Fig. 6, the thread-locking surfaces 19 and 20 on the bolt thread are omitted, and the thread-locking surfaces 27 and 28 on the nut thread are omitted, the top of the thread rib on the bolt and the bottom of the thread groove on the nut being formed as concentric cylindrical surfaces 61 and 62 having a slight clearance therebetween. The bolt and nut threads are otherwise formed in the same manner as the threads 14 and 15, the bolt 49 having its thread 50 formed with a single pair of oppositely facing, thread-locking surface portions 51 and 52, similar to surface portions 21 and 22, and a pair of oppositely facing abutment surface portions 53 and 54 similar to surface portions 17 and 18 of thread 14; and the nut 55 having its thread 56 formed with a single pair of oppositely facing, thread-locking surface portions 57 and 58 similar to surface portions 25 and 26, and a pair of oppositely facing abutment surface portions 59 and 60 similar to surface portions 23 and 24 of thread 15.

In Fig. 8 is shown a pair of engaged bolt and nut threads formed as in the case of the pair of threads 14 and 15 except that for the oppositely facing, helicoidal, thread-locking surface portions of zero transverse curvature at the tops of the thread ribs of the bolt and nut, there are substituted oppositely facing, helicoidal, thread-locking surface portions each having a slight transverse curvature, these surface portions being formed by giving the tops of the thread ribs a slightly rounded form so that the tops of said ribs each have a convex surface the highest point of which is midway between the sides of the rib and forms the dividing line between the oppositely facing, transversely curved, thread-locking surfaces. In this view, bolt 63 has its thread 64 formed with one pair of oppositely-facing, thread-locking surface portions 65 and 66 of zero transverse curvature similar to surface portions 21 and 22 of thread 14, a second pair of oppositely facing, thread-locking surface portions 67 and 68 curving transversely of the thread slightly toward the axial line of the thread from the medial line of the top of the thread rib, and a pair of oppositely facing abutment surface portions 69 and 70 similar to abutment surface portions 17 and 18 of thread 14 and connecting the outer edges of portions 67 and 68 with the inner edges of portions 65 and 66, respectively. The nut 71 has its thread 72 formed with one pair of oppositely facing, thread-locking surface portions 73 and 74 of zero transverse curvature similar to portions 27 and 28 of thread 15, a second pair of oppositely facing, thread-locking surface portions 75 and 76 curving transversely of the thread slightly away from the axial line of the thread from the medial line of the top of the thread rib, and a pair of oppositely facing abutment surface portions 77 and 78 similar to portions 23 and 24 of thread 15 and connecting the outer edges of portions 75 and 76 with the inner edges of portions 73 and 74, respectively. Threads of this form are easy to cut and reduce to some extent the wear on the cutting tool and formation of burrs in cutting the threads. It will be seen also that a transversely curved locking surface is presented to a coacting locking surface of zero transverse curvature, thus permitting the coacting surfaces to be easily wedged together, and permitting jamming of the surfaces without biting of a sharp edge of either of the telescoping surfaces into the opposed surface so that possible damaging of the coacting jam surfaces from this source is avoided. There is a slight clearance, as shown, between the coactive locking portions of the two threads when in the neutral position, for the purpose heretofore described.

In Fig. 9 is shown a pair of engaged screw threads having coactive abutment portions similar to the abutment portions of threads 14 and 15, but in which all the thread-locking surfaces have a transverse curvature. In this form of thread connection the advantages pointed out in connection with the form shown in Fig. 8 are attained to a greater degree. In this construction the bolt 79 has its thread 80 formed with two oppositely facing, helicoidal, abutment surface portions 81 and 82 and the nut 83 has its thread 84 formed with two oppositely facing, helicoidal, abutment surfaces 85 and 86 similar to, and coactive in the same manner, and for the same purposes, as the abutment surface portions of threads 14 and 15. The top of the thread rib on the nut and the top of the thread rib on the bolt are rounded as in the case of the nut thread 72 in Fig. 8, to provide a convex surface on each rib highest at the medial line of the rib and merging with the adjacent edges of the abutment portions of the rib. The bottom of the thread groove in the nut and the bottom of the thread groove in the bolt are rounded to form a concave surface at the bottom of each groove lowest at the medial line of the groove. The curvature of the concave bottom of each thread groove is made less than the curvature of the opposed convex thread rib top, and the curvature of the bottoms of the bolt and nut thread grooves is such as to provide on each thread a pair of oppositely facing, thread-locking surface portions sloping relatively to the axial line of the thread within the angle of friction of the coactive locking surface portions of the threads, while the curvature of the tops of the bolt and nut thread ribs is such as to provide on each thread a second pair of oppositely facing, thread-locking surface portions sloping relatively to the axial line of the thread within said angle of friction, each locking surface portion having a slight curvature transversely of the thread. The oppositely facing, thread-locking surface portions 87 and 88 on the bolt thread (formed by the concave bottom of the bolt thread groove) are adapted to coact with the oppositely facing, thread-locking surface portions 90 and 89, respectively, on the nut thread (formed by the convex top of the nut thread rib), and the oppositely facing, thread-locking surface portions 91 and 92 on the nut thread (formed by the concave bottom of the nut thread groove) are adapted to coact with the oppositely facing, thread-locking surface portions 94 and 93 on the bolt thread (formed by the convex top of the bolt thread rib), in the same manner and for the same purposes as the several sets of thread-locking surfaces on threads 14 and 15. The sharper curvature of the tops of the thread ribs than the opposed bottoms of the thread grooves is of advantage in insuring jamming of the thread-locking surfaces without requiring the greatest precision in cutting the curved surfaces. There is a slight clearance between all the transversely curved, coactive, thread-locking surfaces in the neutral position of the threads, as shown.

The thread connection shown in Fig. 11 is precisely like that shown in Fig. 9, except that the bottom of the nut thread groove and the top of the bolt thread rib are so curved that there is no contact between these surfaces 95 and 96 in any position of the threads. In this construction the bolt 97 has its thread 98 formed with abutment surface portions 99 and 100 similar to abutment portions 81 and 82 in Fig. 9, and thread-locking portions 101 and 102 similar to the locking portions 87 and 88 in Fig. 9; and the nut 103 has its thread 108 formed with abutment portions 104 and 105 similar to abutment portions 85 and 86 in Fig. 9 and thread-locking portions 106 and 107 similar to locking portions 89 and 90 in Fig. 9. It will be obvious that a threaded connection of this kind may be formed in which 97 would represent the nut and 103 the bolt. There is a slight clearance between the coactive thread-locking surfaces in the neutral position of the threads in the construction shown in Fig. 9.

In Fig. 10 is shown a thread connection in which the engaged male and female threads each have a single pair of oppositely facing, helicoidal, thread-locking surface portions, of zero curvature transversely of the thread, and a pair of oppositely facing, helicoidal abutment surface portions, of zero curvature transversely of the thread, as in the case of the constructions shown in Figs. 5 and 6, but these surfaces on each thread are so arranged that the two abutment surfaces are slightly out of axial register, and so that one locking surface portion extends across the top of the thread rib while the other locking surface portion extends across the bottom of the thread groove, the locking surfaces being, therefore, also out of axial register. In this view of the drawings, the bolt 109 has its thread 110 formed with two oppositely facing, helicoidal, thread-locking surface portions 111 and 112 of zero transverse curvature, each making an angle with the axial line of the thread less than the angle of friction of the coacting thread surfaces, said portions being located at opposite sides of a helicoidal abutment surface portion 114 and sloping in opposite directions from said abutment portion toward the axial line of the thread, the surfaces 111, 112 and 114 all being at one side of the other abutment surface portion 113 of the thread, and the locking surface portion 112 being substantially wider than locking surface portion 111. Abutment surface portions 113 and 114 are of zero transverse curvature and each makes an angle with the axial line of the thread greater than the angle of friction of the coacting thread surfaces, and said surface portions diverge from each other toward the axial line of the thread, the abutment surface portion 113 being slighty wider than abutment surface portion 114 and connecting one edge of locking portion 111 of each thread convolution with the outer edge of locking portion 112 of an adjacent thread convolution. The nut 115 has its thread 116 formed with two oppositely facing, helicoidal, thread-locking surface portions 117 and 118 of zero transverse curvature, each making an angle with the axial line of the thread less than the angle of friction of the coacting thread surfaces, said portions being located at opposite sides of a helicoidal abutment surface portion 120 and sloping in opposite directions from said abutment portion away from the axial line of the thread, the surface portions 117, 118 and 120 all being at one side of the other abutment surface portion 119 of the thread, and the locking portion 118 being substantially wider than locking portion 117. Abutment surface portions 119 and 120 are of zero transverse curvature and each makes an angle with the axial line of the thread greater than the angle of friction of the coacting thread surfaces, and said surface portions diverge from each other away from the axial line of the thread, the portion 119 being slightly wider than portion 120 and connecting one edge of locking portion 117 of each thread convolution with the outer edge of locking portion 118 of an adjacent thread convolution. There is a slight clearance between the coacting opposed thread-locking surface portions of the bolt and nut threads and a substantial clearance between the coacting opposed abutment surface portions of the bolt and nut threads in the neutral position of the threads, as shown, for the same purposes as in the forms of thread connections hereinbefore described.

It will be observed that in each form of thread connection shown and described there is disclosed a construction in which male and female threads have substantial side play and one thread is adapted to lock on the other when the threads are displaced crosswise of each other in either direction to take up the side play in the direction of displacement; in which the engaged threads are adapted to be jammed into self-locking or self-holding frictional engagement by taking up the side play in either direction without permanent distortion or deformation of the threads, so that the engaged threads may be repeatedly locked and unlocked; in which the coacting locking surfaces of male and female threads slope relatively to the axial line of the threads within the angle of friction of said surfaces; in which locking surfaces on different threads are coactive to screw one member on the other in either of two different directions at the pitch rate until the traveling member meets resistance sufficient to displace the engaged threads crosswise of each other; and in which the engaged threads have abutment portions coactive to limit positively the extent of permissible side play between the threads in both directions and arranged to arrest side play after self-locking of the coactive locking surface portions and before the jamming action of the active locking surface portions generates bursting stress exceeding the elastic limit of the nut, said coacting abutment surface portions being disposed sufficiently abruptly to the axial line of the threads to form positive side-play-limiting stops and having sufficient depth to withstand great axial load stresses and also being coactive to advance a nut on the bolt against the work at the pitch rate after jamming of the threads into self-holding relation.

It will be observed also that, in the forms of thread connection shown in Figs. 1 to 4, 7, 8 and 9, not only is the double-acting or reversible locking effect obtained but, whether the locking effect be obtained by thread displacement in one direction or the other, a male thread and a female thread are locked together along two different helicoidal surface portions on each thread,—that is, in each locking effect the male and female threads have a double self-holding bind on each other; whereas, in the forms of thread connections shown in Figs. 5, 6, 10 and 11, the male and female threads are coactive to attain the double-acting or reversible locking effect between the threads, but, in each locking effect, the two threads are locked together along only one helicoidal surface portion on each thread,—that is, in each locking effect the male and female threads have a single self-holding bind on each other.

While the abutment surface portions in the several forms of thread connections are shown as of zero curvature transversely of said surface portions, they may be curved transversely, if desired; and abutment surface portions of zero curvature perpendicular to the axial line of the thread may be employed, if desired.

Features of invention shown and described herein but not claimed from the subject-matter of divisional applications filed by me on February 26, 1931, and serially numbered 518,424 and 518,425.

What I claim is:

1. A tight-holding screw element having a screw thread formed with two oppositely facing, helicoidal, side play limiting, abutment surface portions disposed abruptly to the axial line of the thread for engagement with a complementary thread, and also formed with two oppositely facing, helicoidal, thread-locking surface portions sloping transversely of the thread at a sufficiently slight degree relatively to the axial line of the thread to permit either of said sloping surface portions to be forced into self-locking jammed engagement with a complementary thread within the limits of side play allowed by said abutment surface portions.

2. A tight-holding screw element having a thread of constant pitch formed with two identical oppositely inclined, helicoidal, jam locking, surface portions extending from end to end of the thread side by side and making an angle with the axial line of the thread less than the angle of friction, and also formed with two identical oppositely facing helicoidal, jam-action limiting, abutment surface portions extending from end to end of the thread at opposite sides of said pair of locking surface portions and making an angle with the axial line of the thread greater than the angle of friction.

3. In combination, a pair of tight-holding screw threaded members having engaged male and female screw threads, the contours of said threads being corelated to permit relative crosswise displacement of the threads and to provide abutment surface portions on the threads coactive to limit positively the extent of said relative crosswise displacement, and to provide two oppositely sloping, jam-locking, surface portions shiftable one at a time into self-locking engagement with the other thread by displacement of the threads to one or the other limit of crosswise thread displacement.

4. A tight-holding screw-thread coupling for separable members comprising a male thread and a female thread on the respective members of equal and constant pitch, said threads each having a pair of oppositely facing helicoidal abutment surface portions and a pair of oppositely sloping helicoidal thread-locking surface portions extending from end to end thereof, the thread-locking surface portions of the male thread being opposed to the respective thread-locking surface portions of the female thread of similar direction of slope and all the thread-locking surface portions sloping transversely thereof relatively to the axial line of the threads within the angle of friction, the two abutment surface portions of the male thread each being opposed to and engageable with a different one of the abutment portions of the female thread upon sufficient crosswise displacement between the threads to effect a self-locking grip between a different pair of opposed similarly sloping thread-locking surface portions of the male and female threads.

5. A self-holding thread coupling for a plurality of screw thread coupled members comprising a male thread on one member of constant pitch and cross-sectional contour, and a female thread of constant pitch and cross-sectional contour on a second member and engaged with the male thread on the first member, the engaged threads being of equal pitch, said threads having helicoidal abutment portions disposed sufficiently abruptly relatively to the axial line of the threads to limit positively the extent of relative crosswise displacement between the threads and corelated to permit appreciable crosswise displacement of one thread relatively to the other in opposite directions from free-turning relation, one of the threads having two oppositely facing helicoidal reaction taking surface portions meeting edge to edge at the top of the thread rib and the other thread having two oppositely facing helicoidal reaction taking surface portions meeting edge to edge at the bottom of the thread groove, said reaction taking surface portions sloping transversely thereof within the angle of friction relatively to the axial line of the threads and being corelated for free screwing of one member relatively to the other when all said abutment portions of the threads are out of contact and for self-locking frictional engagement of one of said portions of one thread with the corresponding sloping portion of the other thread upon the arrest of crosswise displacement in either direction of one thread relatively to the other by contact of abutment portions of the threads.

In testimony whereof I hereunto affix my signature.

WILLIAM E. HOKE.